United States Patent
Chen et al.

(10) Patent No.: US 12,552,262 B2
(45) Date of Patent: Feb. 17, 2026

(54) ECONOMICAL OPTIMIZATION STRATEGY CONSTRUCTION METHOD FOR LATERAL STABILITY CONTROL OF ELECTRIC VEHICLE

(71) Applicants: CHANGZHOU INSTITUTE OF TECHNOLOGY, Changzhou (CN); JIANGSU UNIVERSITY, Zhenjiang (CN); ANHUI UNIVERSITY, Hefei (CN)

(72) Inventors: Jianfeng Chen, Changzhou (CN); Yicai Ye, Changzhou (CN); Chuanye Tang, Changzhou (CN); Jingbo Zhao, Changzhou (CN); Qiang Wu, Changzhou (CN); Weiqi Zhou, Changzhou (CN); Wenqing Yao, Changzhou (CN); Wen Sun, Changzhou (CN)

(73) Assignees: CHANGZHOU INSTITUTE OF TECHNOLOGY, Changzhou (CN); JIANGSU UNIVERSITY, Zhenjiang (CN); ANHUI UNIVERSITY, Hefei (CN)

( * ) Notice: Subject to any disclaimer, the term of this patent is extended or adjusted under 35 U.S.C. 154(b) by 158 days.

(21) Appl. No.: 18/289,245

(22) PCT Filed: Jul. 29, 2022

(86) PCT No.: PCT/CN2022/108769
§ 371 (c)(1),
(2) Date: Nov. 2, 2023

(87) PCT Pub. No.: WO2023/240760
PCT Pub. Date: Dec. 21, 2023

(65) Prior Publication Data
US 2025/0115134 A1 Apr. 10, 2025

(30) Foreign Application Priority Data

Jun. 16, 2022 (CN) .......................... 202210682844.3

(51) Int. Cl.
*B60L 15/20* (2006.01)
(52) U.S. Cl.
CPC .......... *B60L 15/20* (2013.01); *B60L 2240/12* (2013.01); *B60L 2240/22* (2013.01); *B60L 2240/423* (2013.01)
(58) Field of Classification Search
CPC .. B60L 15/20; B60L 2240/12; B60L 2240/22; B60L 2240/423; Y02T 10/72;
(Continued)

(56) References Cited

U.S. PATENT DOCUMENTS

2011/0264328 A1 10/2011 Brueggemann et al.

FOREIGN PATENT DOCUMENTS

| CN | 110228462 A | 9/2019 |
| CN | 111497826 A | 8/2020 |

(Continued)

*Primary Examiner* — Alan D Hutchinson
(74) *Attorney, Agent, or Firm* — Bayramoglu Law Offices LLC

(57) ABSTRACT

An economical optimization strategy construction method and system for lateral stability control of an electric vehicle, and a computer-readable storage medium are provided. The method includes: firstly constructing a lateral stability control system model with active allocation optimization to achieve the coordinational allocation between effective working areas of each part by means of a coordinational variable L; secondly, on the basis of the system model with active allocation optimization, designing a lateral stability controller under a model predictive control framework, where the designed objective function J makes the motion state of the vehicle track the expected value at steady state; and finally, considering the mapping relationship between (Continued)

the additional yaw moment and the coordinational variable L, constructing a three-dimensional surface, and analyzing the influence of the coordinational variable L, and determining the workflow of a regulator of the coordinational variable L.

17 Claims, 7 Drawing Sheets

(58) Field of Classification Search
CPC ................ B60W 30/02; B60W 50/00; B60W 2050/0019; B60W 2050/0031; B60W 2710/083
See application file for complete search history.

(56) References Cited

FOREIGN PATENT DOCUMENTS

| | | |
|---|---|---|
| CN | 111873985 A | 11/2020 |
| CN | 112092645 A | 12/2020 |
| CN | 113002528 A | 6/2021 |
| CN | 113442906 A | 9/2021 |
| CN | 114408019 A | 4/2022 |
| CN | 114572191 A | 6/2022 |

ECONOMICAL OPTIMIZATION STRATEGY CONSTRUCTION METHOD FOR LATERAL STABILITY CONTROL OF ELECTRIC VEHICLE

CROSS REFERENCE TO THE RELATED APPLICATIONS

This application is the national phase entry of International Application No. PCT/CN2022/108769, filed on Jul. 29, 2022, which is based upon and claims priority to Chinese Patent Application No. 202210682844.3, filed on Jun. 16, 2022, the entire contents of which are incorporated herein by reference.

TECHNICAL FIELD

The present invention relates to the technical field of electric vehicle control, in particular to an economical optimization strategy construction method and system for lateral stability control of an electric vehicle, and a computer-readable storage medium.

BACKGROUND

The intelligent assisted driving technology, which is helpful for reducing the energy consumption of vehicles and improving driving experience, has become a research hotspot in the field of vehicle control technology. The lateral stability control (LSC) system is a key component of intelligent assisted driving, control strategies of which can be summarized into three categories:
  (1) Direct yaw moment control (DYC);
  (2) Active front steering control (AFS); and
  (3) AFS and DYC integrated control (AFS/DYC).

At present, most of the research on LSC systems focuses on the design and optimization of an upper controller, and less involves the torque distribution law of the lower layer.

A four-wheel independent drive electric vehicle (4WID-EV) uses a new drive structure with an in-wheel motor that can be independently controlled by a controller. In recent years, a variety of cascade control structures based on AFS/DIC integrated control have emerged, but it is difficult to coordinate between the effective working areas of AFS and DIC. Electrification provides a new direction to solve the problem of environmental pollution caused by traditional vehicles, but the development of electric vehicles is seriously constrained by problems such as short cruising range. Considering that the torque distribution of the in-wheel motor has great potential in improving the overall efficiency of the motor, an economical optimization strategy that can achieve the reasonable distribution of the torque of the in-wheel motor is urgently needed.

SUMMARY

In order to overcome the deficiencies in the prior art, the present invention aims to provide an economical optimization strategy construction method and system for lateral stability control of an electric vehicle.

To achieve the above objective, the present invention provides the following scheme:
  an economical optimization strategy construction method for lateral stability control of an electric vehicle, including
  constructing a vehicle system dynamics model according to physical parameters of the vehicle under constant speed;
  determining a lateral stability control system model and a reference model of a four-wheel independent drive electric vehicle with active allocation optimization according to the vehicle system dynamics model, the lateral stability control system model including a coordinational variable;
  constructing a lateral stability controller with optimal distribution according to the lateral stability control system model and the reference model;
  establishing an objective function of the optimal economic saturation plan and the constraint of the objective function with the optimal overall efficiency of a motor as the objective, according to the lateral stability controller;
  constructing a three-dimensional surface according to the additional yaw moment output by the lateral stability controller and the coordinational variable;
  determining the workflow of a regulator of the coordinational variable based on the three-dimensional surface; and
  adjusting the coordinational variable in the objective function according to the workflow to optimize the efficiency of the motor.

Preferably, the vehicle system dynamics model is:

$$\dot{X} = AX + BU + C;$$

where the state vector $$X = \begin{bmatrix} \beta \\ r \end{bmatrix},$$

the control vector $$U = \begin{bmatrix} \Delta M \\ \Delta \delta_f \end{bmatrix},$$

the system matrix $$A = \begin{bmatrix} -2\dfrac{C_f + C_r}{mv_x} & -2\dfrac{C_f l_f - C_r l_r}{mv_x^2} - 1 \\ -2\dfrac{C_f l_f - C_r l_r}{I_Z} & -2\dfrac{C_f l_f^2 + C_r l_r^2}{I_Z v_x} \end{bmatrix},$$

the control matrix $$B = \begin{bmatrix} 0 & 2\dfrac{C_f}{mv_x} \\ \dfrac{1}{I_z} & 2\dfrac{l_f C_f}{I_z} \end{bmatrix},$$

the constant matrix $$C = \begin{bmatrix} 2\dfrac{C_f}{mv_x} \\ 2\dfrac{C_f l_f}{I_z} \end{bmatrix} \delta_f, \dot{X}$$

is the first-order differential of the state vector X, m is the mass of the whole vehicle, vy is the lateral velocity, vx is the longitudinal velocity, r is the yaw velocity, ΔM is the additional yaw moment, Iz is the moment of inertia around the z axis at the center of mass of the vehicle, lf and lr are the distance from the center of mass to the centers of front and rear wheels, Cf and Cr are the cornering stiffness of the front and rear wheels, δf is the steering angle of front wheels input by the driver, Δδf is the active front wheel steering angle, and β is the vehicle slip angle.

Preferably, the lateral stability control system model is:

$$\dot{\overline{X}} = \overline{A}\overline{X} + \overline{B}U;$$

where the deviation of the system quantity of state from a reference model is $$\overline{X} = \begin{bmatrix} \tilde{\beta} \\ \tilde{r} \\ \dot{\tilde{\beta}} \\ \dot{\tilde{r}} \end{bmatrix},$$

$\tilde{\beta}$ is the deviation of the vehicle slip angle, $\tilde{r}$ is the deviation of the yaw velocity, $\dot{\overline{X}}$ is the first-order differential of $\overline{X}$, the coefficient matrix $$\overline{A} = \begin{bmatrix} -2\dfrac{C_f+C_r}{mv_x}(1-L) & -2\dfrac{C_f l_f - C_r l_r}{mv_x^2} - 1(1-L) & 0 & 0 \\ -2\dfrac{C_f l_f - C_r l_r}{I_z}(1-L) & -2\dfrac{C_f l_f^2 + C_r l_r^2}{I_z v_x}(1-L) & 0 & 0 \\ 0 & 0 & -2\dfrac{C_f+C_r}{mv_x} & -2\dfrac{C_f l_f - C_r l_r}{mv_x^2} - 1 \\ 0 & 0 & -2\dfrac{C_f l_f - C_r l_r}{I_z} & -2\dfrac{C_f l_f^2 + C_r l_r^2}{I_z v_x} \end{bmatrix},$$

L is the coordinational variable, and the coefficient matrix $$\overline{B} = \begin{bmatrix} 0 & \dfrac{(1-L)}{I_z} & 0 & 0 \\ 0 & 0 & \dfrac{2C_f L}{mv_x} & \dfrac{2l_f C_f L}{I_z} \end{bmatrix}.$$

Preferably, the reference model is:

$$r_{ref} = \dfrac{2C_f C_r (l_f + l_r) v_x}{2C_f C_r (l_f + l_r)^2 - mv_x^2(C_f l_f - C_r l_r)} \delta$$

$$\beta_{ref} = \dfrac{-1}{2C_f + 2C_r}\left[\dfrac{(-2C_f l_f + 2C_r l_r - v_x)}{v_x} r_{ref} + 2C_f \delta\right]$$

where δ is the front wheel steering angle, and βref and rref are the desired vehicle slip angle and yaw velocity, respectively.

Preferably, the lateral stability controller is:

$$J = \dfrac{1}{2}\|\overline{X}_t^{N_p}\|_Q + \dfrac{1}{2}\sum_{k=1}^{N_p-1}\left(\|\overline{X}_t^k\|_Q^2 + \|U_t^k\|_R^2\right) + \rho\varphi^2$$

$$\overline{X}_t^{k+1} = (I + \overline{A}T)\overline{X}_t^k + \overline{B}TU_t^k$$

$$\overline{X}_t^k = X_t^k - X_{ref}(t)$$

$$\Delta\underline{\delta}_f + \varphi\sigma_\delta < \Delta\delta_f < \Delta\overline{\delta}_f + \varphi\sigma_\delta$$

$$\Delta\underline{U} + \varphi\sigma_U < \Delta U < \Delta\overline{U} + \varphi\sigma_U$$

where J is the cost function of the lateral stability control system, matrices Q and R are constant positive definite matrices, ρ is the weight coefficient, T is the time interval of unit step, Np is the prediction step size, Xref(t) and $X_t^k$ are the reference value at t and the state quantity of the kth prediction step respectively, I is the unit matrix, ΔU is the change value of the control quantity, $\Delta\overline{U}$ and $\Delta\underline{U}$ are upper and lower limits of ΔU respectively, φ is the relaxation variable, and σδ and σU are relaxation coefficients.

Preferably, the objective function is:

$$\min_{sat(U_T)} J_e =$$

$$\|\Lambda U_T - \Delta M(L)\|_{pT}^2 + \sum_{i=lf}^{lf,lr,rr,rf} \|1/g(s,T_i)\|_{v_{ei}}^2 + \|sat(U_T)\|_{Q_T}^2 + \|\Delta U_T\|_{R_T}^2$$

where Je is the cost function of the torque distribution of the in-wheel motor, the coefficient matrix Λ=[1 1 −1 −1]b/(2R), R is the wheel radius, b is the left and right wheel track, the control quantity UT=[Tlf Tlr Trf Trr]T, Ti(i=lf, lr, rr, rf) is the motor torque, the subscripts lf, lr, rr and rf represent the left front wheel, left rear wheel, right rear wheel, right front wheel, respectively, vei and pT are weight coefficients, QT and RT are both weight matrices, and sat( ) is the saturation function.

Preferably, the constraint of the objective function is:

$$\Delta\underline{U}_T \leq \Delta U_T \leq \Delta\overline{U}_T$$

$$[1\ 1\ 1\ 1]U_T = T_t$$

-continued $$sat(U_T(t)) = \begin{cases} u_T(t), & |U_T(t)| \leq U_{Tmax} \\ \text{sign}(U_T(t))U_{Tmax}, & |U_T(t)| > U_{Tmax} \end{cases}$$

where $\Delta \overline{U}_T$ and $\Delta \underline{U}_T$ are maximum and minimum values of the increment $\Delta UT$, respectively, Tr is the total drive torque, UTmax is the maximum control input, and sign( ) is the sign function.

Preferably, determining the workflow of a regulator of the coordinational variable based on the three-dimensional surface includes:

determining a two-dimensional plane according to the three-dimensional surface, where the two-dimensional plane is the plane when the vertical axis of the three-dimensional surface is zero; the coordinate axis $X_T$ and the coordinate axis $Y_T$ of the three-dimensional surface are both in-wheel motor torques, and the coordinate axis $Z_E$ of the three-dimensional surface is the motor efficiency;

constructing a torque constraint for the in-wheel motor, where the torque constraint is:

$$x_1 + y_1 = z_1 = z^* + \Delta z$$
$$x_3 + y_2 = z_2 = z^* - \Delta z;$$

where the in-wheel motor torque Tlf, Tlr, Trr and Trf are $x_1$, $y_1$, $x_2$ and $y_2$, respectively, Tr/2 is recorded as $z^*$, and $R\Delta M/b$ is recorded as $\Delta z$;

determining first and second lines on the basis of the geometric relationship of the torque constraint, where projections of points on the first and second lines in the two-dimensional plane in X and Y coordinate axes are the in-wheel motor torque $x_1$, $y_1$, $x_2$ and $y_2$, respectively; and on the basis of theoretical analysis of Gauss surface, determining the workflow according to the first line, the second line, the three-dimensional surface and the two-dimensional plane.

An economical optimization strategy construction system for lateral stability control of an electric vehicle, including:

a dynamics model construction block, used for constructing a vehicle system dynamics model according to physical parameters of the vehicle under constant speed;

a control system model constructing module, used for determining a lateral stability control system model and a reference model of a four-wheel independent drive electric vehicle with active allocation optimization according to the vehicle system dynamics model, the lateral stability control system model including a coordinational variable;

a controller determining module, used for constructing a lateral stability controller with optimal distribution according to the lateral stability control system model and the reference model;

a constraint determining module, used for establishing an objective function of an optimal economic saturation plan and a constraint of the objective function with the optimal overall efficiency of a motor as the objective, according to the lateral stability controller;

a surface constructing module, used for constructing a three-dimensional surface according to the additional yaw moment output by the lateral stability controller and the coordinational variable;

a workflow determining module, used for determining the workflow of a regulator of the coordinational variable based on the three-dimensional surface; and an adjusting module, used for adjusting the coordinational variable in the objective function according to the workflow to optimize the efficiency of the motor.

A computer-readable storage medium, on which a computer program is stored, where the computer program, when executed by the processor, implements the steps in the economical optimization strategy construction method for lateral stability control of the electric vehicle in any one of claims 1 to 8.

According to the specific embodiments provided by the present invention, the present invention discloses the following technical effects:

The present invention provides an economical optimization strategy construction method and system for lateral stability control of an electric vehicle, and a computer-readable storage medium. The method includes: firstly constructing a lateral stability control system model with active allocation optimization to achieve the coordinational allocation between effective working areas of each part by means of coordinational variable L; secondly, on the basis of the system model with active allocation optimization, designing a lateral stability controller under a model predictive control framework, where the designed objective function J makes the motion state of the vehicle track the expected value at steady state, and the objective function Je is used for torque distribution; and finally, considering the mapping relationship between the additional yaw moment output by the controller and the coordinational variable L, constructing a three-dimensional surface; and analyzing the influence of the coordinational variable L on the overall efficiency of a in-wheel motor, and determining the workflow of a regulator of the coordinational variable L to improve the overall efficiency of the in-wheel motor.

BRIEF DESCRIPTION OF THE DRAWINGS

In order to more clearly illustrate the embodiments of the present invention or technical schemes in the prior art, the following will briefly introduction the drawings required in the embodiments. Apparently, the drawings described below are merely some embodiments of the present invention, for a common person skilled in the art, other drawings can also be obtained according to these drawings without creative labor.

DETAILED DESCRIPTION OF THE EMBODIMENTS

The technical scheme in the examples of the present invention will be clearly and completely illustrated below with reference to the drawings in the embodiments of the present invention. Clearly, the described embodiments are part of the embodiments of the present invention, but not all. Based on the examples of the present invention, all other examples obtained by those of ordinary skill in the art without creative efforts shall fall within the protection scope of the present invention.

Reference herein to "embodiments" means that a particular feature, structure or characteristic described in conjunction with an embodiment may be included in at least one embodiment of the present application. The occurrence of the phrase in various positions in the description does not necessarily refer to the same embodiment, nor is it a separate or alternative embodiment that is exclusive with other embodiments. A person skilled in the art expressly and implicitly understand that the embodiments described herein may be combined with other embodiments.

The terms "first", "second", "third" and "fourth" in the description and claims of the present application and the drawings are used for distinguishing different objects, rather than describing a particular order. In addition, the terms "include" and "have" and any variations thereof, are intended to cover non-exclusive inclusions. For example, a series of steps, procedures, methods, etc. are not limited to the listed steps, but optionally include those that are not listed, or optionally further include other step elements inherent to the processes, methods, products or equipment.

The present invention aims to provide an economical optimization strategy construction method and system for lateral stability control of an electric vehicle, and a computer-readable storage medium, which can improve the overall efficiency of an in-wheel motor.

In order to make the above objects, features and advantages of the present invention more obvious and easy to understand, the present invention is further described in detail in conjunction with the drawings and specific embodiments.

Figure 1:
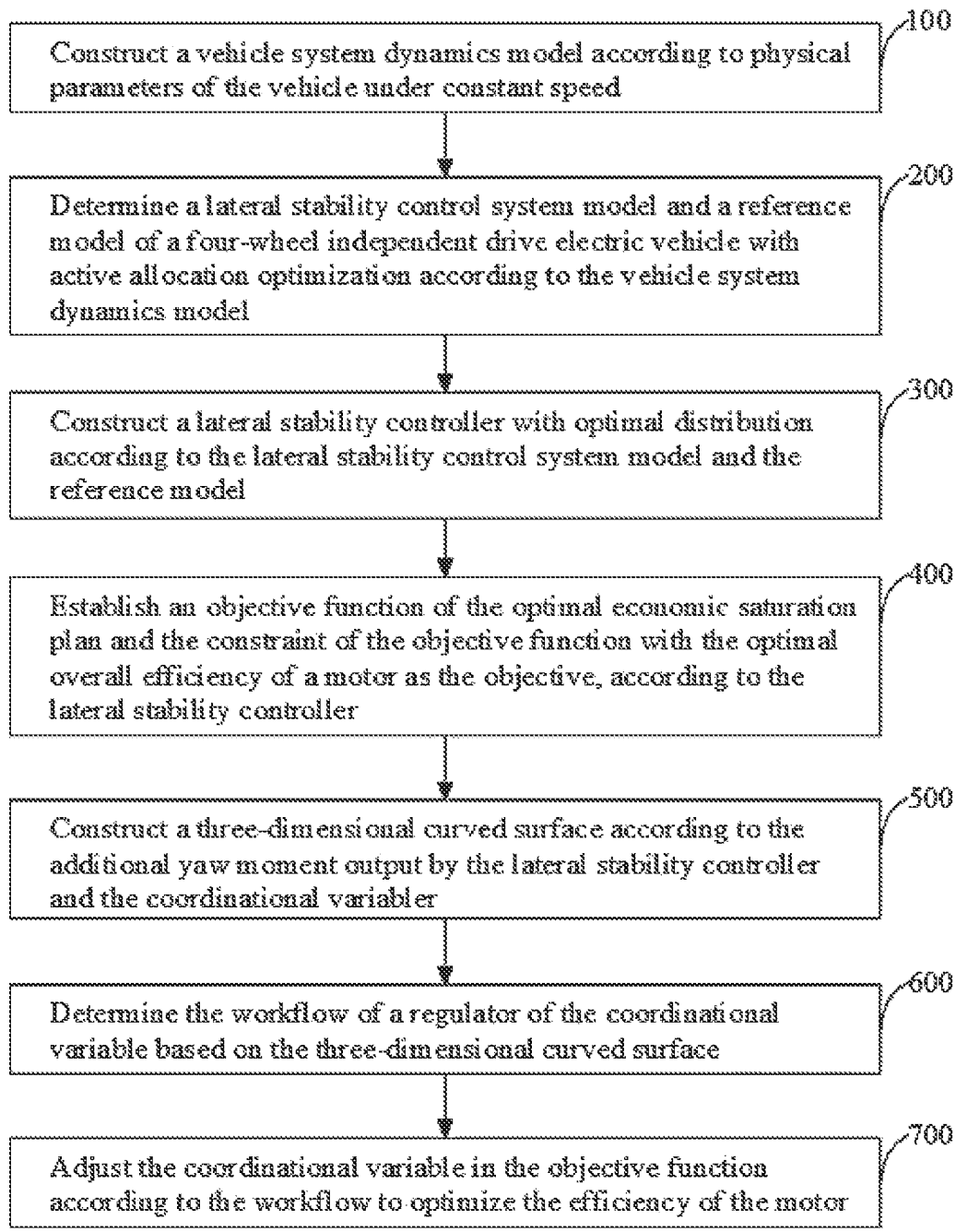
FIG. 1 is a flowchart of the economic optimization strategy construction method in an embodiment provided in the present invention.

FIG. 1 is a flowchart of the economic optimization strategy construction method in an embodiment provided in the present invention; as shown in FIG. 1, the present invention provides an economical optimization strategy construction method for lateral stability control of an electric vehicle, including step 100: constructing a vehicle system dynamics model according to physical parameters of the vehicle under constant speed;

step 200: determining a lateral stability control system model and a reference model of a four-wheel independent drive electric vehicle with active allocation optimization according to the vehicle system dynamics model, the lateral stability control system model including a coordinational variable;

step 300: constructing a lateral stability controller with optimal distribution according to the lateral stability control system model and the reference model;

step 400: establishing an objective function of the optimal economic saturation plan and the constraint of the objective function with the optimal overall efficiency of a motor as the objective, according to the lateral stability controller;

step 500: constructing a three-dimensional surface according to the additional yaw moment output by the lateral stability controller and the coordinational variable;

step 600: determining the workflow of a regulator of the coordinational variable based on the three-dimensional surface; and step 700: adjusting the coordinational variable in the objective function according to the workflow to optimize the efficiency of the motor.

Figure 2:
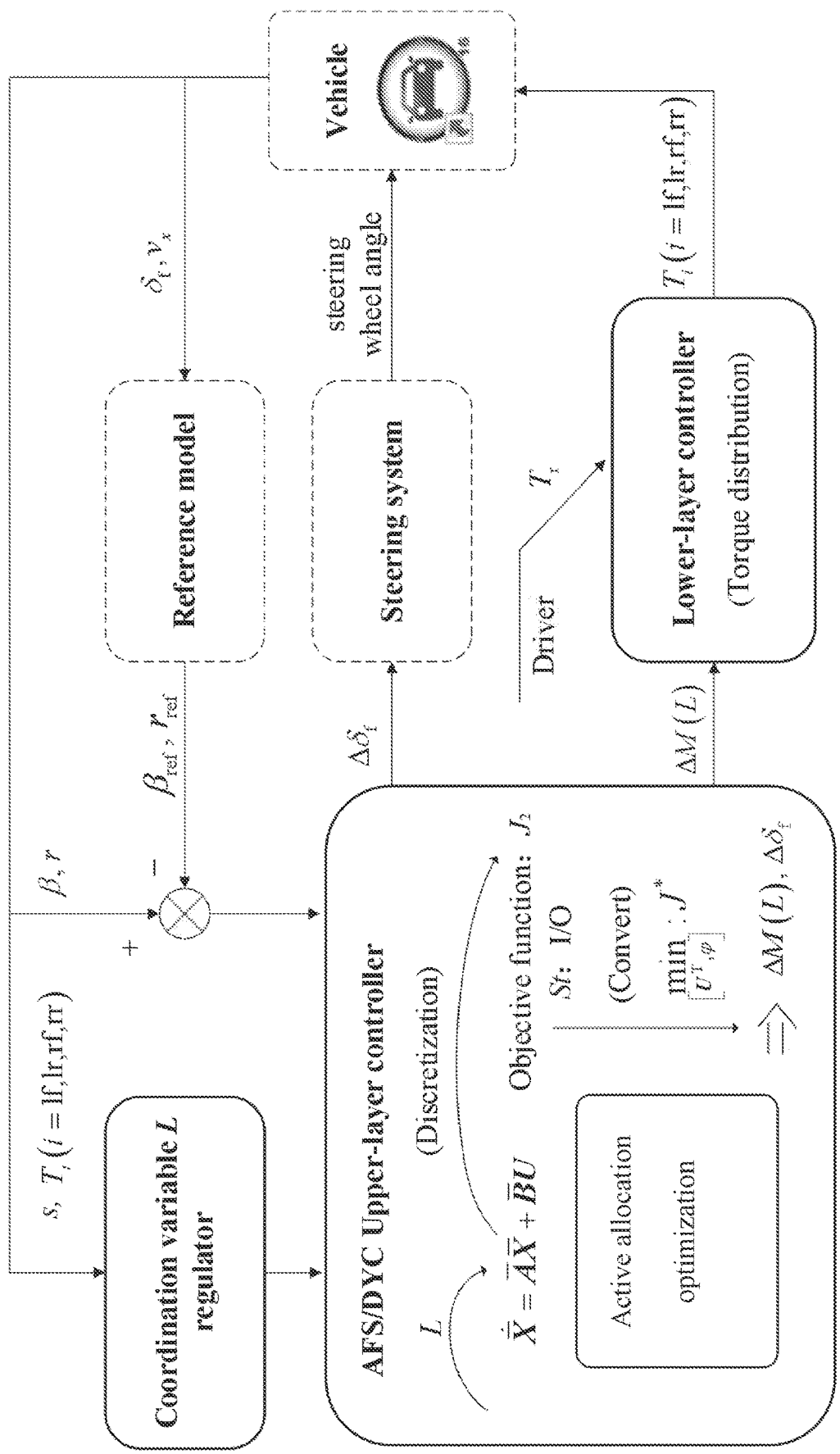
FIG. 2 is a schematic diagram of the economic optimization strategy of the in-wheel motor in an embodiment provided in the present invention, where an active allocation optimization in FIG. 2 is specifically described in FIG. 4.

FIG. 2 is a schematic diagram of the economic optimization strategy of the in-wheel motor in an embodiment provided in the present invention; as shown in FIG. 2, the present embodiment includes five steps: establishing a vehicle system dynamics model, determining a 4WID-EV lateral stability control system model with active allocation optimization, determining a reference model of a lateral stability control system, constructing a lateral stability controller according to the MPC algorithm and designing a coordinated variable L regulator.

Preferably, the vehicle system dynamics model is:

$$\dot{X} = \overline{AX} + \overline{B}U;$$

where the state vector $$X = \begin{bmatrix} \beta \\ r \end{bmatrix},$$

the control vector $$U = \begin{bmatrix} \Delta M \\ \Delta \delta_f \end{bmatrix},$$

the system matrix $$A = \begin{bmatrix} -2\dfrac{C_f + C_r}{mv_x} & -2\dfrac{C_f l_f - C_r l_r}{mv_x^2} - 1 \\ -2\dfrac{C_f l_f - C_r l_r}{I_z} & -2\dfrac{C_f l_f^2 + C_r l_r^2}{I_z v_x} \end{bmatrix},$$

the control matrix $$B = \begin{bmatrix} 0 & 2\dfrac{C_f}{mv_x} \\ \dfrac{1}{I_z} & 2\dfrac{l_f C_f}{I_z} \end{bmatrix},$$

the constant matrix $$C = \begin{bmatrix} 2\dfrac{C_f}{mv_x} \\ 2\dfrac{C_f l_f}{I_z} \end{bmatrix} \delta_f, \dot{X}$$

is the first-order differential of the state vector X, m is the mass of the whole vehicle, vy is the lateral velocity, vx is the longitudinal velocity, r is the yaw velocity, ΔM is the additional yaw moment, Iz is the moment of inertia around the z axis at the center of mass of the vehicle, lf and lr are the distance from the center of mass to the centers of front and rear wheels, Cf and Cr are the cornering stiffness of the front and rear wheels, δf is the steering angle of front wheels input by the driver, Δδf is the active front wheel steering angle, and β is the vehicle slip angle.

Figure 3:
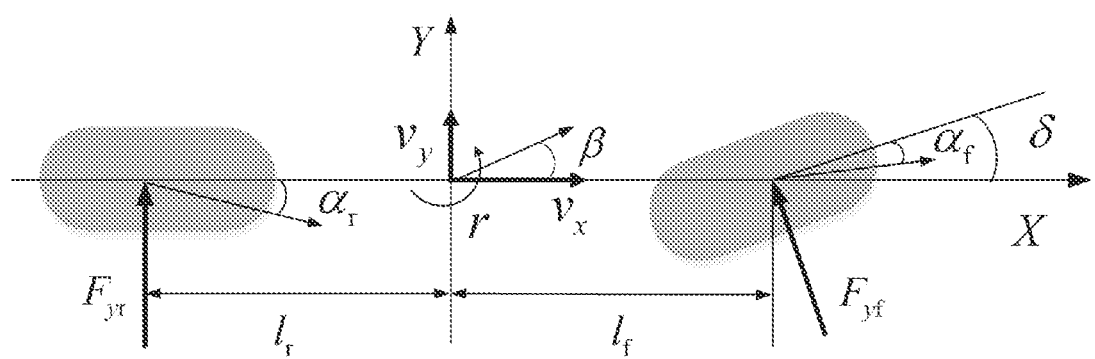
FIG. 3 is a schematic diagram of a monorail vehicle model in an embodiment provided in the present invention.

Specifically, in the steps (1) in the present embodiment, a vehicle system dynamics model is established as follows:

a monorail model of the vehicle is as shown in FIG. 3, assuming that the vehicle is driving at a constant speed without consideration to the influence of a vehicle suspension, a steering system, air resistance, etc., the dynamics of the vehicle can be expressed as:

$$\dot{X} = AX + BU + C \quad (1)$$

where the state vector $$X = \begin{bmatrix} \beta \\ r \end{bmatrix},$$

the control vector $$U = \begin{bmatrix} \Delta M \\ \Delta \delta_f \end{bmatrix},$$

the system matrix $$A = \begin{bmatrix} -2\dfrac{C_f + C_r}{mv_x} & -2\dfrac{C_f l_f - C_r l_r}{mv_x^2} - 1 \\ -2\dfrac{C_f l_f - C_r l_r}{I_z} & -2\dfrac{C_f l_f^2 + C_r l_r^2}{I_z v_x} \end{bmatrix},$$

the control matrix $$B = \begin{bmatrix} 0 & 2\dfrac{C_f}{mv_x} \\ \dfrac{1}{I_z} & 2\dfrac{l_f C_f}{I_z} \end{bmatrix},$$

the constant matrix $$C = \begin{bmatrix} 2\dfrac{C_f}{mv_x} \\ 2\dfrac{C_f l_f}{I_z} \end{bmatrix} \delta_f, \dot{X}$$

is the first-order differential of the state vector X, m is the mass of the whole vehicle, vy is the lateral velocity, vx is the longitudinal velocity, r is the yaw velocity, ΔM is the additional yaw moment, Iz is the moment of inertia around the z axis at the center of mass of the vehicle, lf and lr are the distance from the center of mass to the centers of front and rear wheels, Cf and Cr are the cornering stiffness of the front and rear wheels, δf is the steering angle of front wheels input by the driver, Δδf is the active front wheel steering angle, and β is the vehicle slip angle.

Figure 4:
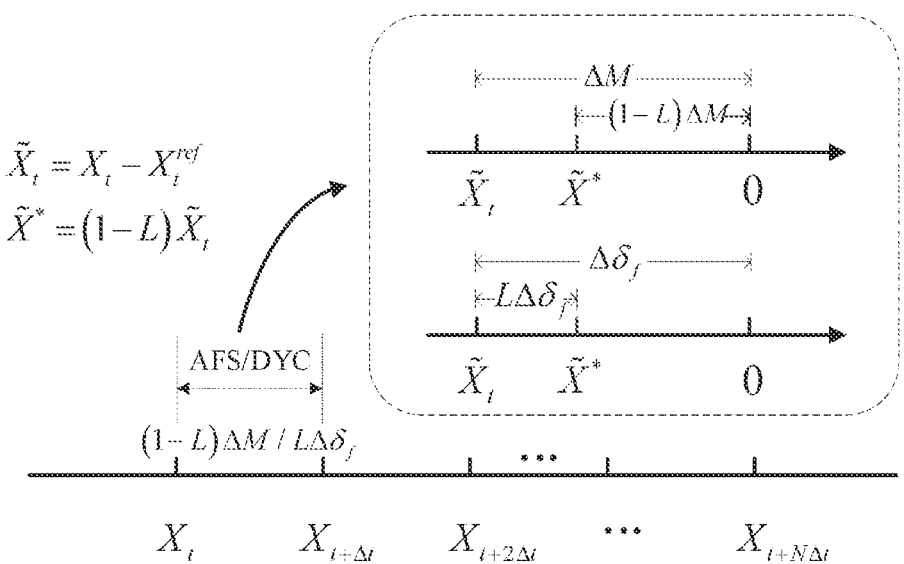
FIG. 4 is a schematic diagram of an active allocation optimization scheme in an embodiment provided in the present invention.

Further, step (2) of the present embodiment is to determine a 4WID-EV lateral stability control system model with active allocation optimization, as follows:

If the working area of the 4WID-EV lateral stability control system is divided into AFS and DIC and the intermediate state vector $\tilde{X}^* = (1-L)\tilde{X}_i$ (where L is the coordinational variable) is taken into account, the control quantity input to the system can be expressed as $\overline{U} = [(1-L)\Delta M, L\Delta\delta_f]^T$. As shown in FIG. 4, assuming that the working area of the controller at any time is jointly determined by AFS and DIC, under the action of the control quantity $\overline{U}$, the deviation $\overline{X}$ of the system state quantity will reach its reference value via the intermediate state vector $\overline{X}$. In this case, the active allocation optimization scheme with the coordinational variable L can be expressed as:

$$\dot{\overline{X}} = \overline{A}\overline{X} + \overline{B}\overline{U} \quad (2)$$

where the deviation of the system quantity of state from a reference model is $$\overline{X} = \begin{bmatrix} \tilde{\beta} \\ \tilde{r} \\ \dot{\tilde{\beta}} \\ \dot{\tilde{r}} \end{bmatrix},$$

$\tilde{\beta}$ is the deviation of the vehicle slip angle, $\tilde{r}$ is the deviation of the yaw velocity, $\dot{\overline{X}}$ is the first-order differential of $\overline{X}$, the coefficient matrix, L is the coordinational variable, and the coefficient matrix $$\bar{A} = \begin{bmatrix} -2\dfrac{C_f+C_r}{mv_x} & -2\dfrac{C_fl_f-C_rl_r}{mv_x^2} - & 0 & 0 \\ (1-L) & 1(1-L) & & \\ -2\dfrac{C_fl_f-C_rl_r}{I_z} & -2\dfrac{C_fl_f^2-C_rl_r^2}{I_zv_x} & 0 & 0 \\ (1-L) & (1-L) & & \\ 0 & 0 & -2\dfrac{C_f+C_r}{mv_x} & -2\dfrac{C_fl_f-C_rl_r}{mv_x^2}-1 \\ 0 & 0 & -2\dfrac{C_fl_f-C_rl_r}{I_z} & -2\dfrac{C_fl_f^2-C_rl_r^2}{I_zv_x} \end{bmatrix}$$

$$\bar{B} = \begin{bmatrix} 0 & \dfrac{(1-L)}{I_z} & 0 & 0 \\ 0 & 0 & \dfrac{2C_fL}{mv_x} & \dfrac{2l_fC_fL}{I_z} \end{bmatrix}$$

Preferably, the reference model is:

$$r_{ref} = \dfrac{2C_fC_r(l_f+l_r)v_x}{2C_fC_r(l_f+l_r)^2 - mv_x^2(C_fl_f - C_rl_r)}\delta;$$

$$\beta_{ref} = \dfrac{-1}{2C_f+2C_r}\left[\dfrac{(-2C_fl_f+2C_rl_r-v_x)}{v_x}r_{ref} + 2C_f\delta\right];$$

where $\delta$ is the front wheel steering angle, and $\beta_{ref}$ and $r_{ref}$ are the desired vehicle slip angle and yaw velocity, respectively.

Specifically, step (3) of the present embodiment is to determine a reference model of the lateral stability control system model, with expression as follows:

$$r_{ref} = \dfrac{2C_fC_r(l_f+l_r)v_x}{2C_fC_r(l_f+l_r)^2 - mv_x^2(C_fl_f - C_rl_r)}\delta \quad (3)$$

$$\beta_{ref} = \dfrac{-1}{2C_f+2C_r}\left[\dfrac{(-2C_fl_f+2C_rl_r-v_x)}{v_x}r_{ref} + 2C_f\delta\right] \quad (4)$$

where $\delta$ is the front wheel steering angle. Given that $\beta_{ref}$ is smaller, it is common to take $B_{ref}\approx 0$ in studies on LSC. In addition, lateral acceleration is often limited by the tyre-road adhesion coefficient $\mu$. When the lateral acceleration $a_y \leq \mu g$ (g is the gravitational acceleration), $r_{ref}$ shall meet the conditions $$|r_{ref}| \leq \left|\dfrac{0.85\mu g}{v_x}\right|.$$

Preferably, the lateral stability controller is:

$$J = \dfrac{1}{2}\|\bar{X}_t^{N_p}\|_Q + \dfrac{1}{2}\sum_{k=1}^{N_p-1}(\|\bar{X}_t^k\|_Q^2 + \|U_t^k\|_R^2) + \rho\varphi^2;$$

$$\bar{X}_t^{k+1} = (I + \bar{A}T)\bar{X}_t^k + \bar{B}TU_t^k;$$

$$\bar{X}_t^k = X_t^k - X_{ref}(t);$$

$$\Delta\underline{\delta}_f + \varphi\sigma_\delta < \Delta\delta_f < \Delta\bar{\delta}_f + \varphi\sigma_\delta;$$

$$\Delta\underline{U} + \varphi\sigma_U < \Delta U < \Delta\bar{U} + \varphi\sigma_U$$

where J is the cost function of the lateral stability control system, matrices Q and R are constant positive definite matrices, $\rho$ is the weight coefficient, T is the time interval of unit step, Np is the prediction step size, Xref(t) and $X_t^k$ are the reference value at t and the state quantity of the kth prediction step respectively, I is the unit matrix, $\Delta U$ is the change value of the control quantity, $\Delta\bar{U}$ and $\Delta\underline{U}$ are upper and lower limits of $\Delta U$ respectively, $\varphi$ is the relaxation variable, and $\sigma\delta$ and $\sigma U$ are relaxation coefficients.

Preferably, the objective function is:

$$\min_{sat(U_T)} J_e = \|\Lambda U_T - \Delta M(L)\|_{P_T}^2 + \sum_{i=lf}^{lf,lr,rr,rf}\|1/g(s,T_i)\|_{v_{ei}}^2 + \|sat(U_T)\|_{Q_T}^2 + \|\Delta U_T\|_{R_T}^2$$

where Je is the cost function of the torque distribution of the in-wheel motor, the coefficient matrix $\Lambda=[1\ 1\ -1\ -1]b/(2R)$, R is the wheel radius, b is the left and right wheel track, the control quantity UT=[Tlf Tlr Trf Trr]T, Ti(i=lf, lr, rr, rf) is the motor torque, the subscripts lf, lr, rr, rf represent the left front wheel, left rear wheel, right rear wheel, right front wheel respectively, vei and pT are weight coefficients, QT and RT are both weight matrices, and sat( ) is the saturation function.

Preferably, the constraint of the objective function is:

$$\Delta\underline{U}_T \leq \Delta U_T \leq \Delta\bar{U}_T$$

$$[1\ 1\ 1\ 1]U_T = T_r$$

$$sat(U_T(t)) = \begin{cases} U_T(t), & |U_T(t)| \leq U_{Tmax} \\ \text{sign}(U_T(t))U_{Tmax}, & |U_T(t)| > U_{Tmax} \end{cases};$$

where $\Delta\bar{U}_T$ and $\Delta\underline{U}_T$ are maximum and minimum values of the increment $\Delta U_T$, Tr is the total drive torque, UTmax is the maximum control input, and sign( ) is the sign function.

Specifically, step (4) in the present embodiment is to construct a lateral stability controller according to the MPC algorithm, as follows:

The optimal control problem of MPC can be expressed as making the motion state of the vehicle track the expected value of the reference model under the condition that the I/O constraints are met; the corresponding objective function J can be expressed as:

$$J = \frac{1}{2}\|\overline{X}_t^{N_p}\|_Q + \frac{1}{2}\sum_{k=1}^{N_p-1}\left(\|\overline{X}_t^k\|_Q^2 + \|U_t^k\|_R^2\right) + \rho\varphi^2 \quad (5)$$

Constraints:

$$\overline{X}_t^{k+1} = (I + \overline{A}T)\overline{X}_t^k + \overline{B}TU_t^k \quad (6)$$

$$\overline{X}_t^k = X_t^k - X_{ref}(t) \quad (7)$$

$$\Delta\underline{\delta}_f + \varphi\sigma_\delta < \Delta\delta_f < \Delta\overline{\delta}_f + \varphi\sigma_\delta \quad (8)$$

$$\Delta\underline{U} + \varphi\sigma_U < \Delta U < \Delta\overline{U} + \varphi\sigma_U \quad (9)$$

where J is the cost function of LSC, matrices Q and R are constant positive definite matrices, ρ is the weight coefficient, T is the time interval of unit step, Np is the prediction step size, Xref(t) and $X_t^k$ are the reference value at t and the state quantity of the kth prediction step respectively, I is the unit matrix, ΔU is the change value of the control quantity, $\Delta\overline{U}$ and $\Delta\underline{U}$ are upper and lower limits of ΔU respectively, φ is the relaxation variable, and σδ and σU are relaxation coefficients. Since the efficiency ei of the in-wheel motor is related to the motor torque Ti and the speed s, i.e., ei=g(s, Ti), the overall efficiency of the motor will change with the change of output torque of each independent drive in-wheel motor configured by the controller. In order to maximize the overall efficiency of the in-wheel motor Σe i, the economic saturation optimal planning problem with the objective of optimizing the overall efficiency of the motor is designed:

$$\min_{sat(U_T)} J_e = \quad (10)$$

$$\|\Delta U_T - \Delta M(L)\|_{P_T}^2 + \sum_{i=lf}^{lf,lr,rr,rf}\|1/g(s,T_i)\|_{v_{ei}}^2 + \|sat(U_T)\|_{Q_T}^2 + \|\Delta U_T\|_{R_T}^2$$

Constraints:

$$\Delta\underline{U}_T \leq \Delta U_T \leq \Delta\overline{U}_T \quad (11)$$

$$[1\ 1\ 1\ 1]U_T = T_r$$

$$sat(U_T(t)) = \begin{cases} U_T(t), & |U_T(t)| \leq U_{Tmax} \\ sign(U_T(t))U_{Tmax}, & |U_T(t)| > U_{Tmax} \end{cases}$$

where Je is the cost function of the torque distribution of the in-wheel motor, the coefficient matrix Λ=[1 1 −1 −1]b/(2R), R is the wheel radius, b is the left and right wheel track, the control quantity UT=[Tlf Tlr Trf Trr]T, Ti(i=lf, lr, rr, rf) is the motor torque, the subscripts lf, lr, rr, rf represent the left front wheel, left rear wheel, right rear wheel, right front wheel respectively, pT is weight coefficient, QT and RT are both weight matrices, $\Delta\overline{U}_T$ and $\Delta\underline{U}_T$ are the maximum and minimum value of the increment ΔUT, Tr is the total drive torque, UTmax is the maximum control input, and Vei is the weight coefficient. If the in-wheel motors are each considered of equal importance, QT=qT I, RT=rT I, qT and rT are all positive real numbers.

Equation (6) is a discrete form of the allocation optimization scheme (2), in which the coefficient matrix changes with the change of the coordinational variable L, i.e., ΔM (L) output by the upper controller makes the distribution of motor torque in the lower control have a variety of possibilities, and reasonable adjustment of the coordinational variable L is expected to improve the overall work efficiency of the motor.

Preferably, determining the workflow of a regulator of the coordinational variable based on the three-dimensional surface includes:
  determining a two-dimensional plane according to the three-dimensional surface, where the two-dimensional plane is the plane when the vertical axis of the three-dimensional surface is zero; the coordinate axis $X_T$ and the coordinate axis $Y_T$ of the three-dimensional surface being both in-wheel motor torques, and the coordinate axis $Z_E$ of the three-dimensional surface being the motor efficiency;
  constructing a torque constraint for the in-wheel motor, where the torque constraint is $$\begin{aligned} x_1 + y_1 = z_1 = z^* + \Delta z \\ x_3 + y_2 = z_2 = z^* - \Delta z \end{aligned};$$

where, the in-wheel motor torque $T_{lf}$, $T_{lr}$, $T_{rr}$ and $T_{rf}$ are $x_1$, $y_1$, $x_2$ and $y_2$, respectively, Tr/2 is recorded as z*, and RΔM/b is recorded as Δz;
  determining first and second lines on the basis of the geometric relationship of the torque constraint, where projections of points on the first and second lines in the two-dimensional plane in X and Y coordinate axes are the in-wheel motor torque $x_1$, $y_1$, $x_2$ and $y_2$, respectively; and
  on the basis of theoretical analysis of Gauss surface, determining the workflow according to the first line, the second line, the three-dimensional surface and the two-dimensional plane.

Figure 5:
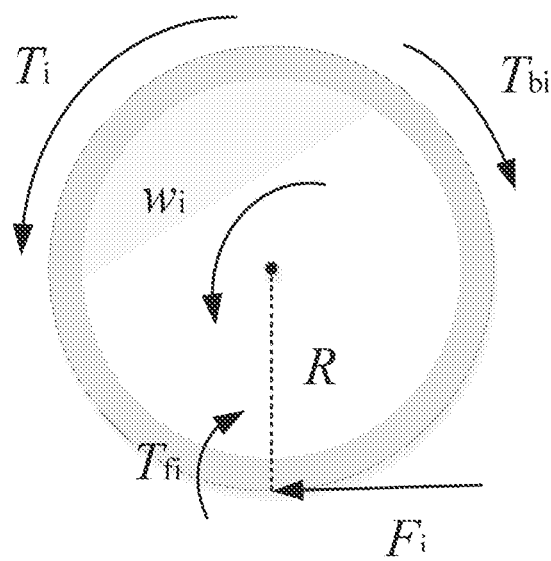
FIG. 5 is a schematic diagram of the wheel rotation balance analysis in an embodiment provided in the present invention.

Specifically, the last step in the present embodiment is to design a regulator of the coordinational variable L, assuming that the vehicle is in a constant speed driving state, i.e., acceleration a=0, braking torque Tbi=0, where i=lf, lr, rr and rf represent the left front, left rear, right rear and right front wheels respectively. The in-wheel motor generates additional yawing moment ΔM via torque distribution, and it is necessary to ensure that the generated total drive torque Tr can overcome air resistance, rolling resistance and slope resistance, etc., and the corresponding constraints are expressed as:

$$T_{lf} + T_{lr} + T_{rr} + T_{rf} = T_r \quad (12)$$

$$(F_{lf} + F_{lr} - F_{rr} - F_{rf})\frac{b}{2} = \Delta M$$

where b is the left and right wheel track, and Fi is the longitudinal force of each wheel. The rotational balance of the wheels (ignoring wheel slip) is shown in FIG. 5, with dynamic balance equation as:

$$T_{bi} + T_{fi} + F_i R + J\dot{\omega}_i = T_i \quad (13)$$

where R is the wheel radius, Tfi is the rolling resistance coupling moment of each wheel, and ωi is the rotational speed of each wheel. If $\dot{\omega}_i \approx 0$, then equation (13) is substituted into (12), give:

$$T_{lf} + T_{lr} = \frac{T'_r}{2} + \frac{R\Delta M}{b} = 2C_l \tag{14}$$

$$T_{rr} + T_{rf} = \frac{T'_r}{2} - \frac{R\Delta M}{b} = 2C_r$$

where $$T'_r = T_r + [T_{flf} + T_{flr} - (T_{frr} + T_{frf})], \; C_l = \frac{T'_r}{4} + \frac{R\Delta M}{2b} C_r = \frac{T'_r}{4} - \frac{R\Delta M}{2b}.$$

If the load transfer is not taken into account, then Tr'≈Tr. 4WID-EV adjusts the output torque of the in-wheel motor by means of a motor control unit, and further changes the longitudinal tire force to control the yawing motion of the vehicle. With respective to the optimal programming problem shown in Equation (10), the complexity of the optimal analysis of the overall efficiency of motors increases significantly with the increase of the number of motors. To facilitate the discussion of the effect of the coordinational variable L on motor efficiency, equation (14) is denoted shortly as:

$$x_1 + y_1 = z_1 = z^* + \Delta z \tag{15}$$

$$x_3 + y_2 = z_2 = z^* - \Delta z$$

where, the in-wheel motor torque Tlf, Tlr, Trr and Trf are recorded as $x_1$, $y_1$, $x_2$ and $y_2$, respectively, Tr/2 is recorded as $z^*$, and RΔM/b is recorded as $\Delta z$; For ease of analysis, the $X_T Y_T Z_E$ three-dimensional surface S shown in FIG. 6 was constructed in three-dimensional Euclidean space to visually characterize the overall variation trend of torque and efficiency of the four in-wheel motors. where the axes $X_T$ and $Y_T$ are the in-wheel motor torque, and the longitudinal axis $Z_E$ is the motor efficiency. When the motor efficiency is zero (i.e., in the XOY plane), the geometric relationship of equation (15) is as shown by the dashed line in FIG. 6. The projection of points on the dotted lines l1 and l2 in the XOY plane (black marks $M_1$ and $M_2$) on X and Y axes of the in-wheel motor torque $x_1$, $y_1$, $x_2$ and $y_2$ respectively. In addition, the symmetrical centerline of two dashed lines is a function:

$$y = -x + z^* \tag{16}$$

where the miter intercept $z^*$ is only related to the desired torque Tr. It is not difficult to find that the slope of the three dashed lines k≡−1, and the position of the dashed lines is determined by and only by the intercepts $z^*-\Delta z$, $z^*$ and $z^*+\Delta z$. L actively adjusts $\Delta z$, and the dashed intercept corresponding to equation (15) will change accordingly (as the L value decreases, the |Δz| value increases and gets away from the symmetrical centerline; as the L value increases, the |Δz| value decreases and gets close to the symmetry centerline). It should be noted that compared to the traditional AFS/DIC integrated control strategy, adjusting L can extend the movement of points $M_1$ and $M_2$ in FIG. 6 to a two-dimensional XOY plane from a straight line (see dashed lines in FIG. 6). Analysis was carried out as follows, with the theory of Gauss surface:

The parametric surface S can be regarded as a distortion deformation of the plane domain D, the point coordinate (u,v) on the domain D is denoted as the curvilinear coordinate of the surface S, and the parametric equation of the surface S can be expressed as $$\begin{cases} x = u \\ y = v \\ z = -g(0) + g(u) + g(v) \end{cases} \tag{17}$$

where (u,v) is the point coordinate in plane D and (x, y, z) is the point coordinate in surface S. The vector equation for the surface S is $$r = (u, v, -g(0) + g(u) + g(v)) \tag{18}$$

where the partial derivative of the vector r to the variables u and v are $r_u=[1, 0, \dot{g}(u)]^T$ and $r_v=[, 1, \dot{g}(v)]^T$ respectively. Since, $r_u \times r_v = [-\dot{g}(u), -\dot{g}(v), 1]^T \neq 0$, the surface S is a regular parametric surface.

The bending degree of the constructed regular parametric surface S geometrically reflects the change trend of the efficiency of four in-wheel motors. On the basis of the Euler formula related to the normal curvature, calculating the principal direction and principal curvature is the main means to understand the bending of the surface at the current coordinate point. Solving the eigendirection and eigenvalues k1 and k2 of Weingarten mapping of the surface S can obtain the principal direction and principal curvature of the surface. where the average curvature H and Gauss curvature K expressions of the surface generated on the basis of k1 and k2 are:

$$H = \frac{\eta}{2[\dot{g}(u) - \dot{g}(v)]^2} \left( \ddot{g}(u)[1 + \dot{g}(v)^2] + \ddot{g}(v)[1 + \dot{g}(u)^2] \right) \tag{19}$$

$$K = \left( \frac{\eta}{\dot{g}(u) - \dot{g}(v)} \right)^2 \ddot{g}(u) \ddot{g}(v) \tag{20}$$

where $$\eta = \frac{1}{\sqrt{\dot{g}(u)^2 + \dot{g}(v)^2 + 1}}.$$

Obviously, the plus or minus characteristic of Gauss curvature K is determined by $\ddot{g}(u)\ddot{g}(v)$. When. $\ddot{g}(u)\ddot{g}(v)>0$, K>0, the Dupin indicatrix of the surface S at the point (x(u,v), y(u,v), z(u,v)) is a paraboloid, and the approximate surface is an elliptical paraboloid (see domains I and IV in FIG. 6); when. $\ddot{g}(u) \ddot{g}(v)<0$, K<0 the Dupin indicatrix of the surface S at the point (x(u,v), y(u,v), z(u,v)) is two pairs of conjugate hyperbolas, and the approximate surface is a hyperbolic paraboloid (see domains II and III in FIG. 6); when $\ddot{g}(u)\ddot{g}(v)=0$, K=0, the point is a flat point.

As can be seen from the above, the second-order differential of efficiency and torque as a function of g(x) can partially reflect the basic shape of the surface at the coordinate point. In addition, the angle between the unit vector eZ and the unit normal vector n cos<eZ, n> can reflect the orientation of the surface opening. When $M_1$ and $M_2$ meet $\ddot{g}(u)\ddot{g}(v)>0$ and cos<eZ, n>∈[0,π/2), $M_1$ and $M_2$ are located in the domain I, the increase in the coordinational variable L leads to smaller Δz value, and then the points $M_1$ and $M_2$ get closer to the center line l, and the overall efficiency of the motor increases. Similarly, when points $M_1$ and $M_2$ meet $\ddot{g}(u)\ddot{g}(v)>0$ and cos<eZ, n>∈, [π/2,π], the decrease in the coordinational variable L increases efficiency. When both $M_1$ and $M_2$ meet $\ddot{g}(u)\ddot{g}(v)>0$ and only $M_1$ or $M_2$ meets cos<eZ, n>∈[0,π/2), the coordinate points are located in domains I and IV, respectively. The average curvature H characterizes how much the surface is bent at point coordinates. If $H_1>H_2$, then the surface at point $M_1$ is larger in curvature, and the motion of $M_1$ plays a decisive role in the change in overall efficiency. If, $\dot{g}(x_1)<0$, the L value of the coordinational variable increases, when $\dot{g}(x_1)>0$, allow the L value of the coordinational variable to decrease, then $M_1$ moves upwards and the overall efficiency of the motor increases. When H1<H2, the same analysis can be made. This leads to the following inferences:

Inference 1: assuming that the speed of the in-wheel motor is constant, the function of motor efficiency-torque is approximated as $e=\ddot{g}(x)$, and the continuous function g(x) is quadratically differentiable, then the constructed surface S is a regular parametric surface. Correspondingly, the adjustment of L value can increase the average efficiency of the in-wheel motor under sufficient conditions as follows:

(1) When points $M_1$ and $M_2$ both meet $\ddot{g}(u)\ddot{g}(v)>0$ and cos<eZ,n>∈[0,π/2), the coordinational variable L needs to be increased;

(2) When points $M_1$ and $M_2$ both meet $\ddot{g}(u)g(v)>0$ and cos<eZ,n>∈[π/2,π], the coordinational variable L shall decrease; and (3) When $M_1$ and $M_2$ both meet $\ddot{g}(u)\ddot{g}(v)>0$ and only $M_1$ meets cos<eZ,n>∈[0,π/2), the H value is judged: (a) $H_1>H_2$, when $\dot{g}(x_1)>0$, the coordinational variable L shall increase; when $\dot{g}(x_1)<0$, the coordinational variable L shall decrease; and (b) $H_1<H_2$, when $\dot{g}(x_2)<0$, the coordinational variable L shall increase; and when $\dot{g}(x_2)>0$, the coordinational variable L shall decrease.

where eZ is the Z-axis unit vector, n is the unit normal vector of the tangent plane Π at the coordinate point, and the specific expression of the surface average curvature H is $$H = \frac{\ddot{g}(x)(1+\dot{g}(y)) + \ddot{g}(y)(1+\dot{g}(x))}{2[\ddot{g}(x)-\ddot{g}(y)]^2 \sqrt{\dot{g}(x)^2 + \dot{g}(y)^2 + 1}} \quad (21)$$

Note 1: if only $M_2$ in (3) meets cos<eZ, n>=∈[0,π/2), a similar analysis can be performed.

On the surface S, the torque distribution of the in-wheel motor in the optimal programming problem as shown in equation (10) is characterized by the coordinates of points $M_1$ and $M_2$. where $\|sat(U_T)\|_{Q_T}^2$ and equation (14) largely limit the distribution of points $M_1$ and $M_2$, specifically:

$$\|U_T\|_{Q_T}^2 = q_T[(T_{lf}^2 + T_{lr}^2) + (T_{rf}^2 + T_{rr}^2)] = \left[\left(\frac{T_{lf}+T_{lr}}{2} + \Delta m_1\right)^2 + \right. \quad (22)$$

Figure 6:
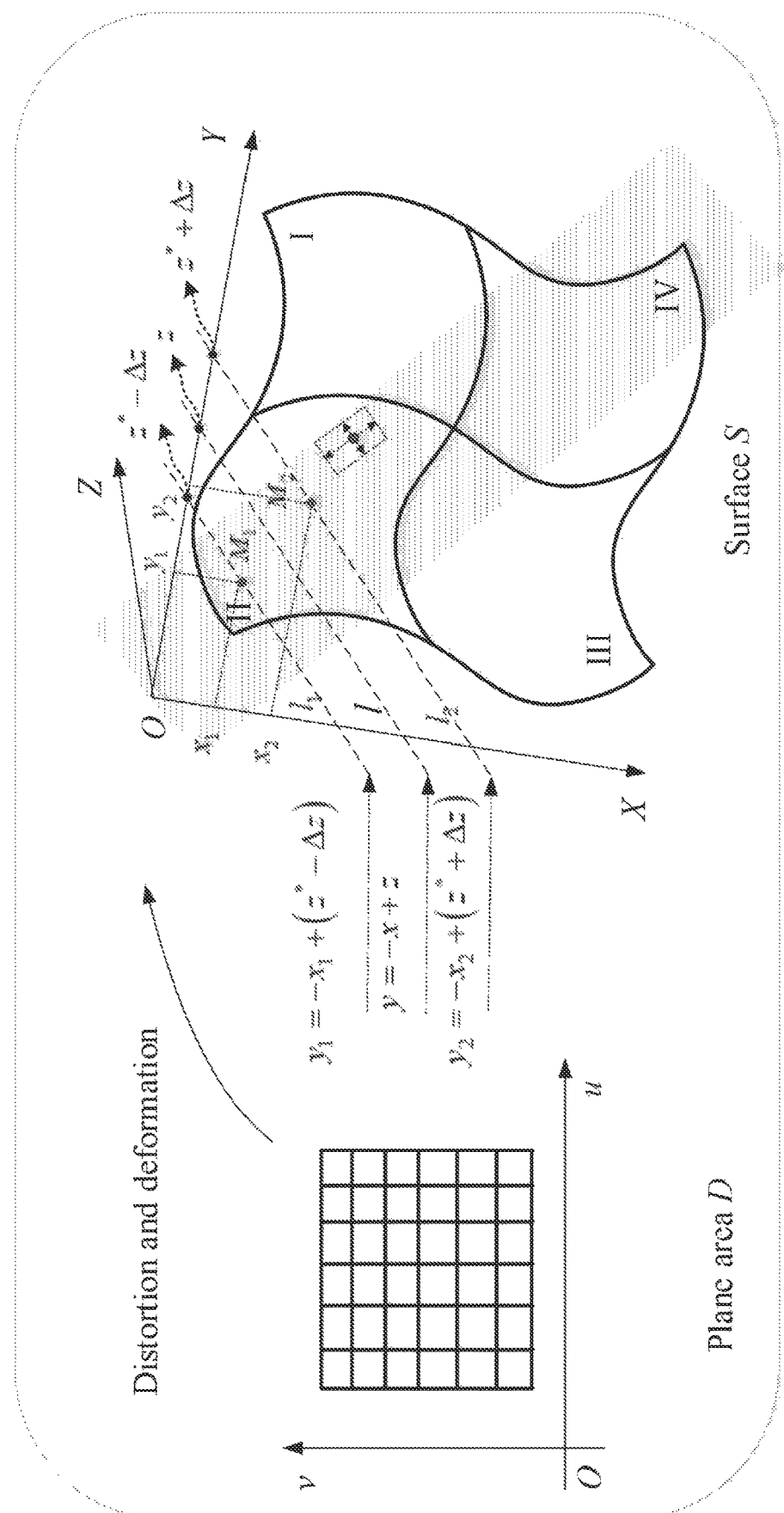
FIG. 6 is a schematic diagram of $X_T Y_T Z_Z$ three-dimensional surface S in an embodiment provided in the present invention.

-continued
$$\left.\left(\frac{T_{lf}+T_{lr}}{2} - \Delta m_1\right)^2\right] + \left[\left(\frac{T_{rf}+T_{rr}}{2} + \Delta m_2\right)^2 + \left(\frac{T_{rf}+T_{rr}}{2} - \Delta m_2\right)^2\right]q_T$$

where $$\Delta m_1 = \frac{T_{lf}-T_{lr}}{2}, \Delta m_2 = \frac{T_{rf}-T_{rr}}{2},$$

substituting equation (14) into equation (22) yields:

$$\|U_T\|_{Q_T}^2 = 2q_T[(C_l^2 + \Delta m_1^2) + (C_r^2 + \Delta m_2^2)] \geq 2q_T(C_l^2 + C_r^2) \quad (23)$$

where the equal sign holds if and only if $\Delta m_1=\Delta m_2=0$. If Je in equation (10) is minimized, $\|sat(U_T)\|_{Q_T}^2$ shall be as small as possible, i.e. there is a small constant M≥0 leading to $\Delta m_1 \leq M$ and $\Delta m_2 \leq M$. Further, the following inferences can be drawn.

inference 2: the projection of coordinate points $M_1$ and $M_2$ on the XOY plane on the surface S is basically distributed in the area close to the 45° diagonal (see gray shaded area in FIG. 6).

Figure 7:
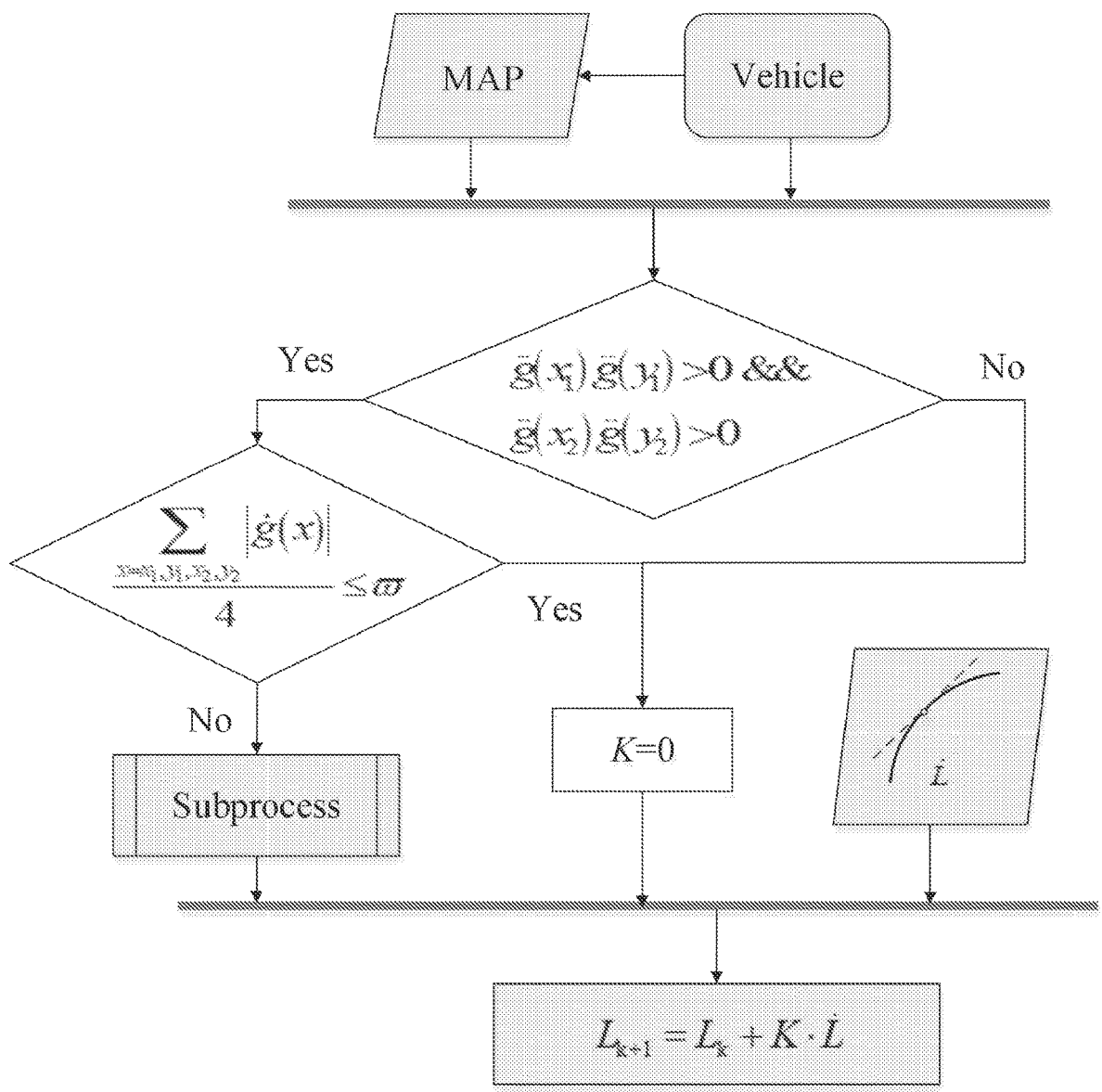
FIG. 7 is the general workflow of the regulator of the coordinational variable L in an embodiment provided in the present invention.
Figure 8:
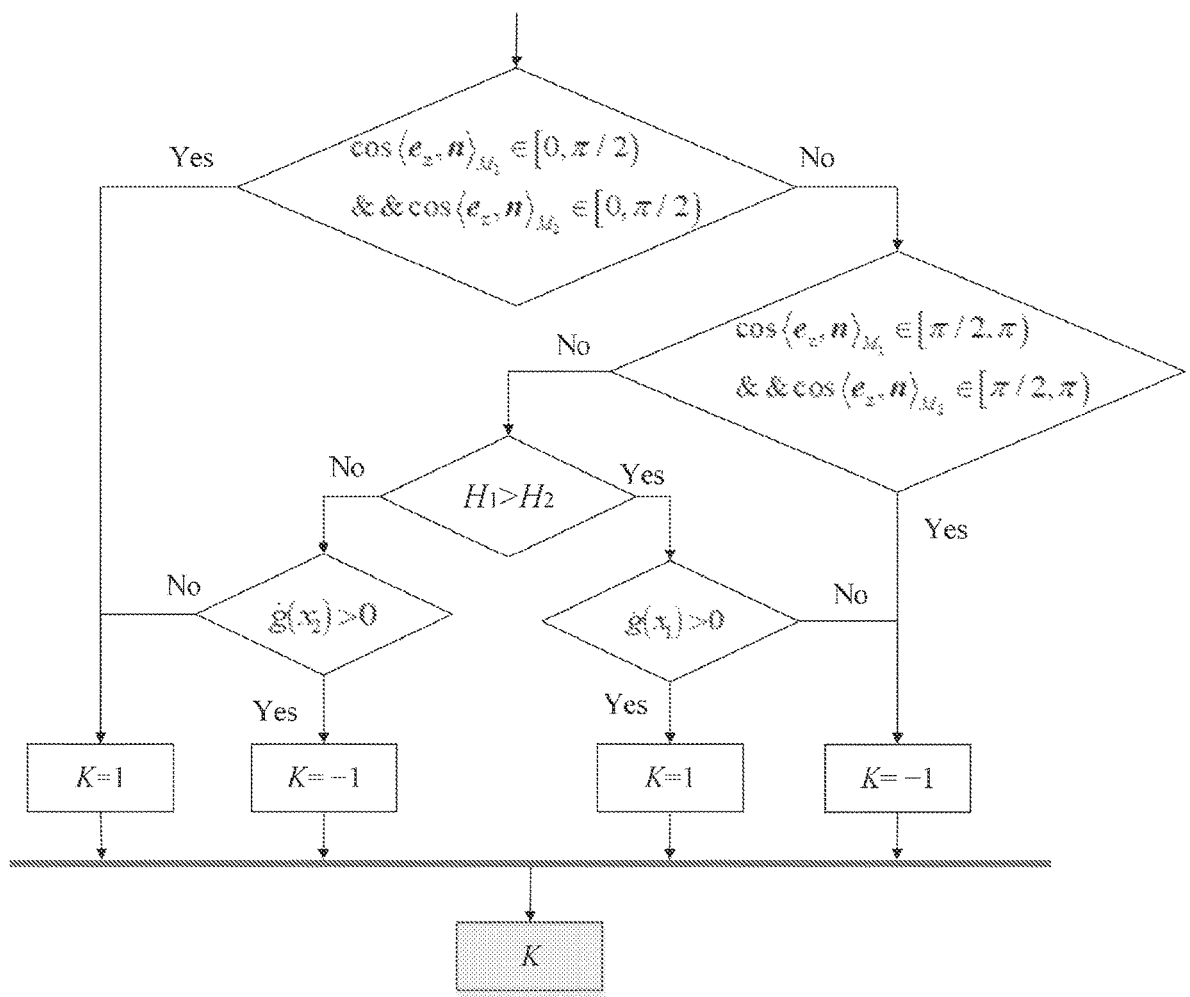
FIG. 8 is a subworkflow of the regulator of the coordinational variable L in an embodiment provided in the present invention.

Further, on the basis of the foregoing inferences 1 and 2, the workflow of the regulator of the coordinational variable L for improving the overall efficiency of the in-wheel motor is determined, as shown in FIGS. 7 and 8. where m is the slope threshold, L is the slope of curve L, and K=−1, K=0 and K=1 represent the three change trends of L (including decrease, constant and increase), respectively. When the following conditions are met:

$$\frac{\sum_{i=x_1,y_1,x_2,y_2} |\dot{g}(i)|}{4} \leq \varpi \quad (24)$$

It is approximated that the surface S changes very little at coordinates $M_1$ and $M_2$.

Corresponding to the aforementioned method, the present embodiment also provides an economical optimization strategy construction system for lateral stability control of an electric vehicle, including:

a dynamics model construction block, used for constructing a vehicle system dynamics model according to physical parameters of the vehicle under constant speed;

a control system model constructing module, used for determining a lateral stability control system model and a reference model of a four-wheel independent drive electric vehicle with active allocation optimization according to the vehicle system dynamics model, the lateral stability control system model including a coordinational variable;

a controller determining module, used for constructing a lateral stability controller with optimal distribution according to the lateral stability control system model and the reference model;

a constraint determining module, used for establishing an objective function of the optimal economic saturation plan and a constraint of the objective function with the optimal overall efficiency of a motor as the objective, according to the lateral stability controller;

a surface constructing module, used for constructing a three-dimensional surface according to the additional yaw moment output by the lateral stability controller and the coordinational variable;

a workflow determining module, used for determining the workflow of a regulator of the coordinational variable based on the three-dimensional surface; and a regulating module, used for regulating the coordinational variable in the objective function according to the workflow to optimize the efficiency of the motor.

The present embodiment also provides a computer-readable storage medium, on which a computer program is stored, where the computer program, when executed by the processor, implements the steps in the economical optimization strategy construction method for lateral stability control of the electric vehicle in any one of claims 1 to 8.

The present invention has the beneficial effects as follows:

(1) The L regulator designed in the present invention can optimize the torque distribution of the 4WID-EV in-wheel motor in real time, and improve the overall efficiency of the in-wheel motor while ensuring the lateral stability of a vehicle; and finally, the energy economy of an electric vehicle is improved, so that the electric vehicle can obtain higher cruising range under the premise of safe driving; and (2) The X T Y T Z Z three-dimensional surface S constructed in the present invention better facilitates the analysis of the overall efficiency of the 4WID-EV in-wheel motor group; considering the saturation characteristics of the motor output torque, the lateral stability controller based on MPC frame design is more suitable for a vehicle system driven by the electric motor.

The embodiments in the present description are each described in a progressive manner, each focuses on the difference from other embodiments, and the same similar parts therebetween can refer to each other. With regard to the method of the disclosure, which corresponds to the device disclosed in the embodiment and is thus described relatively easily, references can be drawn to the description of the device in terms of related parts.

Specific examples are applied herein to elaborate the principles and embodiments of the present invention, and the description of the above embodiments is merely used for helping understand the method of the present invention and the core idea thereof; in addition, for those generally skilled in the art, changes can be made in the specific embodiment and the scope of application according to the ideas of the present invention. In summary, the content of the description should not be understood as a limitation of the present invention.

What is claimed is:

1. An economical optimization strategy construction method for a lateral stability control of an electric vehicle, wherein the economical optimization strategy construction method comprises:

constructing a vehicle system dynamics model according to physical parameters of a vehicle under a constant speed;

determining a lateral stability control system model and a reference model of a four-wheel independent drive electric vehicle with an active allocation optimization according to the vehicle system dynamics model, the lateral stability control system model comprising a coordinational variable;

constructing a lateral stability controller with an optimal distribution according to the lateral stability control system model and the reference model;

establishing an objective function of an optimal economic saturation plan and a constraint of the objective function with an optimal overall efficiency of a motor as an objective, according to the lateral stability controller;

constructing a three-dimensional surface according to an additional yaw moment output by the lateral stability controller and the coordinational variable;

determining a workflow of a regulator of the coordinational variable based on the three-dimensional surface by conducting a theoretical analysis of a Gauss surface on the three-dimensional surface, wherein two coordinate axes of the three-dimensional surface represent in-wheel motor torques and a third coordinate axis represents efficiency of the motor;

adjusting the coordinational variable in the objective function according to the workflow to optimize the efficiency of the motor; and controlling the lateral stability of the electric vehicle based on the adjusted coordinational variable in the objective function.

2. The economical optimization strategy construction method according to claim 1, wherein the vehicle system dynamics model is:

$$\dot{X} = AX + BU + C$$

wherein the state vector $X=[\beta r]$, the control vector $U=[\Delta M\ \Delta\delta_f]$, the system matrix $$A = \begin{bmatrix} -2\dfrac{C_f+C_r}{mv_x} & -2\dfrac{C_f l_f - C_r l_r}{mv_x^2} - 1 \\ -2\dfrac{C_f l_f - C_r l_r}{I_z} & -2\dfrac{C_f l_f^2 + C_r l_r^2}{I_z v_x} \end{bmatrix},$$

the control matrix, $$B = \begin{bmatrix} 0 & 2\dfrac{C_f}{mv_x} \\ \dfrac{1}{I_z} & 2\dfrac{l_f C_f}{I_z} \end{bmatrix},$$

the constant matrix $$C = \begin{bmatrix} 2\dfrac{C_f}{mv_x} \\ 2\dfrac{C_f l_f}{I_z} \end{bmatrix} \delta_f, \dot{X}$$

is a first-order differential of the state vector X, m is a mass of the whole vehicle, $v_y$ is a lateral velocity, $v_x$ is a longitudinal velocity, r is a yaw velocity, $\Delta M$ is the additional yaw moment, $I_z$ is a moment of inertia around the z axis at a center of mass of the vehicle, $l_f$ and $l_r$ are a distance from the center of mass to centers of front and rear wheels, $C_f$ and $C_r$ are a cornering stiffness of the front and rear wheels, $\delta_f$ is a steering angle of front wheels input by a driver, and $\Delta\delta_f$ is an active front wheel steering angle, and $\beta$ is a vehicle slip angle.

3. The economical optimization strategy construction method according to claim 2, wherein the lateral stability control system model is:

$$\dot{\overline{X}} = \overline{A}\overline{X} + \overline{B}U$$

wherein a deviation of a system quantity of state from a reference model is $$\overline{X} = \begin{bmatrix} \tilde{\beta} \\ \tilde{r} \\ \dot{\tilde{\beta}} \\ \dot{\tilde{r}} \end{bmatrix}, \tilde{\beta}$$

is a deviation of vehicle slip angle, $\tilde{r}$ is a deviation of the yaw velocity, $\dot{\overline{X}}$ is a first-order differential of $\overline{X}$, and the coefficient matrix $$\overline{A} = \begin{bmatrix} -2\frac{C_f+C_r}{mv_x}(1-L) & -2\frac{C_f l_f - C_r l_r}{mv_x^2} - 1(1-L) & 0 & 0 \\ -2\frac{C_f l_f - C_r l_r}{I_Z}(1-L) & -2\frac{C_f l_f^2 + C_r l_r^2}{I_Z v_x}(1-L) & 0 & 0 \\ 0 & 0 & -2\frac{C_f+C_r}{mv_x} & -2\frac{C_f l_f - C_r l_r}{mv_x^2} - 1 \\ 0 & 0 & -2\frac{C_f l_f - C_r l_r}{I_Z} & -2\frac{C_f l_f^2 + C_r l_r^2}{I_Z v_x} \end{bmatrix}$$

$$\overline{B} = \begin{bmatrix} 0 & \frac{(1-L)}{I_z} & 0 & 0 \\ 0 & 0 & \frac{2C_f L}{mv_x} & \frac{2l_f C_f L}{I_z} \end{bmatrix},$$

, L is the coordinational variable.

4. The economical optimization strategy construction method according to claim 2, wherein the reference model is:

$$r_{ref} = \frac{2C_f C_r (l_f + l_r) v_x}{2C_f C_r (l_f + l_r)^2 - mv_v^2(C_f l_f - C_r l_r)}\delta;$$

$$\beta_{ref} = \frac{-1}{2C_f + 2C_r}\left[\frac{(-2C_f l_f + 2C_r l_r - v_x)}{v_x}r_{ref} + 2C_f\delta\right];$$

wherein $\delta$ is a front wheel steering angle, and $\beta_{ref}$ and $r_{ref}$ are a desired vehicle slip angle and yaw velocity, respectively.

5. The economical optimization strategy construction method- according to claim 2, wherein the lateral stability controller is:

$$J = \frac{1}{2}\|\overline{X}_t^{N_p}\|_Q + \frac{1}{2}\sum_{k=1}^{N_p-1}\left(\|\overline{X}_t^k\|_Q^2 + \|U_t^k\|_R^2\right) + \rho\varphi^2;$$

$$\overline{X}_t^{k+1} = (I + \overline{A}T)\overline{X}_t^k + \overline{B}TU_t^k$$

$$\overline{X}_t^k = X_t^k - X_{ref}(t)$$

$$\Delta\underline{\delta}_f + \varphi\sigma_\delta < \Delta\delta_f < \Delta\overline{\delta}_f + \varphi\sigma_\delta$$

$$\Delta\underline{U} + \varphi\sigma_U < \Delta U < \Delta\overline{U} + \varphi\sigma_U$$

wherein J is a cost function of the lateral stability control system, matrices Q and R are constant positive definite matrices, $\rho$ is a weight coefficient, T is a time interval of unit step, $N_p$ is a prediction step size, $X_{ref}(t)$ and $X_t^k$ are a reference value at t and a state quantity of a kth prediction step respectively, I is a unit matrix, $\Delta U$ is a change value of a control quantity, $\Delta\overline{U}$ and $\Delta\underline{U}$ and are upper and lower limits of $\Delta U$ respectively, $\varphi$ is a relaxation variable, and $\sigma_\delta$ and $\sigma_U$ are relaxation coefficients.

6. The economical optimization strategy construction method according to claim 2, wherein the objective function is:

$$\min_{sat(U_T)} J_e =$$

$$\|\Lambda U_T - \Delta M(L)\|_{p_T}^2 + \sum_{i=lf}^{lf,lr,rr,rf}\|1/g(s,T_i)\|_{v_{ei}}^2 + \|sat(U_T)\|_{Q_T}^2 + \|\Delta U_T\|_{\beta_f}^2;$$

wherein $J_e$ is a cost function of a torque distribution of an in-wheel motor, the coefficient matrix $\Lambda=[1\ 1\ -1\ -1]b/(2R)$, R is a wheel radius, b is a left and right wheel track, the control quantity $U_T=[T_{lf}\ T_{lr}\ T_{rf}\ T_{rr}]^T$, $T_i$(i=lf, lr, rr, rf) is a motor torque, the subscripts lf, lr, rr, rf represent a left front wheel, a left rear wheel, a right rear wheel, a right front wheel respectively, $v_{ei}$ and $p_T$ are weight coefficients, $Q_T$ and $R_T$ are both weight matrices, and sat( ) is a saturation function.

7. The economical optimization strategy construction method according to claim 6, wherein the constraint of the objective function is:

$$\Delta\underline{U}_T \leq \Delta U_T \leq \Delta\overline{U}_T$$

$$[1\ 1\ 1\ 1]U_T = T_r$$

$$sat(U_T(t)) = \begin{cases} U_T(t), & |U_T(t)| \leq U_{Tmax} \\ \text{sign}(U_T(t))U_{Tmax}, & |U_T(t)| > U_{Tmax} \end{cases}$$

wherein $\Delta \overline{U}_T$ and $\Delta \underline{U}_T$ are maximum and minimum values of the increment $\Delta UT$, respectively, $T_r$ is a total drive torque, $U_{Tmax}$ is a maximum control input, and sign( ) is a sign function.

8. The economical optimization strategy construction method according to claim 2, wherein the operation of determining the workflow of the regulator of the coordinational variable based on the three-dimensional surface comprises:

determining a two-dimensional plane according to the three-dimensional surface, wherein the two-dimensional plane is a plane when a vertical axis of the three-dimensional surface is zero; the coordinate axis $X_T$ and the coordinate axis $Y_T$ of the three-dimensional surface are both in-wheel motor torques, and the coordinate axis $Z_E$ of the three-dimensional surface is the motor efficiency;

constructing a torque constraint for an in-wheel motor, wherein the torque constraint is $$U = \begin{bmatrix} \Delta M \\ \Delta \delta_f \end{bmatrix},$$

wherein the in-wheel motor torque $T_{lf}$, $T_{lr}$, $T_{rr}$ and $T_{rf}$ are $x_1$, $y_1$, $x_2$ and $y_2$, respectively, $T_r/2$ is recorded as $z^*$, and $R\Delta M/b$ is recorded as $\Delta z$;

determining first and second lines on the basis of a geometric relationship of the torque constraint, wherein projections of points on the first and second lines in the two-dimensional plane in X and Y coordinate axes are the in-wheel motor torque $x_1$, $y_1$, $x_2$ and $y_2$, respectively; and on the basis of a theoretical analysis of a Gauss surface, determining the workflow according to the first line, the second line, the three-dimensional surface and the two-dimensional plane.

9. An economical optimization strategy construction system for a lateral stability control of an electric vehicle, wherein the economical optimization strategy construction system comprises:

a dynamics model construction block, configured for constructing a vehicle system dynamics model according to physical parameters of a vehicle under a constant speed;

a control system model constructing module, configured for determining a lateral stability control system model and a reference model of a four-wheel independent drive electric vehicle with an active allocation optimization according to the vehicle system dynamics model, the lateral stability control system model comprising a coordinational variable;

a controller determining module, configured for constructing a lateral stability controller with an optimal distribution according to the lateral stability control system model and the reference model;

a constraint determining module, configured for establishing an objective function of an optimal economic saturation plan and a constraint of the objective function with an optimal overall efficiency of a motor as an objective, according to the lateral stability controller;

a surface constructing module, configured for constructing a three-dimensional surface according to an additional yaw moment output by the lateral stability controller and the coordinational variable;

a workflow determining module, configured for determining a workflow of a regulator of the coordinational variable based on the three-dimensional surface; and a regulating module, configured for regulating the coordinational variable in the objective function according to the workflow to optimize an efficiency of the motor.

10. A computer-readable storage medium, wherein a computer program is stored on the computer-readable storage medium, wherein the computer program, when executed by a processor, implements the steps in the economical optimization strategy construction method in claim 1.

11. The computer-readable storage medium according to claim 10, wherein in the economical optimization strategy construction method, the vehicle system dynamics model is:

$$\dot{X} = AX + BU + C$$

wherein the state vector, $$X = \begin{bmatrix} \beta \\ r \end{bmatrix},$$

the control vector $$U = \begin{bmatrix} \Delta M \\ \Delta \delta_f \end{bmatrix},$$

the system matrix $$A = \begin{bmatrix} -2\dfrac{C_f + C_r}{mv_x} & -2\dfrac{C_f l_f - C_r l_r}{mv_x^2} - 1 \\ -2\dfrac{C_f l_f - C_r l_r}{I_Z} & -2\dfrac{C_f l_f^2 + C_r l_r^2}{I_Z v_x} \end{bmatrix},$$

the control matrix $$B = \begin{bmatrix} 0 & 2\dfrac{C_f}{mv_x} \\ \dfrac{1}{I_z} & 2\dfrac{l_f C_f}{I_z} \end{bmatrix},$$

the constant matrix $$C = \begin{bmatrix} 2\dfrac{C_f}{mv_x} \\ 2\dfrac{C_f l_f}{I_z} \end{bmatrix} \delta_f, \dot{X}$$

is a first-order differential of the state vector X, m is a mass of the whole vehicle, $v_y$ is a lateral velocity, $v_x$ is a longitudinal velocity, r is a yaw velocity, $\Delta M$ is the additional yaw moment, $I_z$ is a moment of inertia around the z axis at a center of mass of the vehicle, $l_f$ and $l_r$ are a distance from the center of mass to centers of front and rear wheels, $C_f$ and $C_r$ are a cornering stiffness of the front and rear wheels, $\delta_f$ is a steering angle of front wheels input by a driver, and $\Delta \delta_f$ is an active front wheel steering angle, and $\beta$ is a vehicle slip angle.

12. The computer-readable storage medium according to claim 11, wherein in the economical optimization strategy construction method, the lateral stability control system model is:

$$\dot{\overline{X}} = \overline{A}\overline{X} + \overline{B}U$$

wherein a deviation of a system quantity of state from a reference model is $$\overline{X} = \begin{bmatrix} \tilde{\beta} \\ \tilde{r} \\ \dot{\tilde{\beta}} \\ \dot{\tilde{r}} \end{bmatrix},$$

is a deviation of the vehicle slip angle, $\tilde{r}$ is a deviation of the yaw velocity, $\dot{\overline{X}}$ is a first-order differential of $\overline{X}$, and the coefficient matrix $$\overline{A} = \begin{bmatrix} -2\dfrac{C_f+C_r}{mv_x}(1-L) & -2\dfrac{C_fl_f-C_rl_r}{mv_x^2} - 1(1-L) & 0 & 0 \\ -2\dfrac{C_fl_f-C_rl_r}{I_z}(1-L) & -2\dfrac{C_fl_f^2+C_rl_r^2}{I_zv_x}(1-L) & 0 & 0 \\ 0 & 0 & -2\dfrac{C_f+C_r}{mv_x} & -2\dfrac{C_fl_f-C_rl_r}{mv_x^2}-1 \\ 0 & 0 & -2\dfrac{C_fl_f-C_rl_r}{I_z} & -2\dfrac{C_fl_f^2+C_rl_r^2}{I_zv_x} \end{bmatrix}$$

$$\overline{B} = \begin{bmatrix} 0 & \dfrac{(1-L)}{I_z} & 0 & 0 \\ 0 & 0 & \dfrac{2C_fL}{mv_x} & \dfrac{2C_fL}{I_z} \end{bmatrix},$$

L is the coordinational variable.

13. The computer-readable storage medium according to claim 11, wherein in the economical optimization strategy construction method, the reference model is:

$$r_{ref} = \dfrac{2C_fC_r(l_f+l_r)v_x}{2C_fC_r(l_f+l_r)^2 - mv_x^2(C_fl_f-C_rl_r)}\delta;$$

$$\beta_{ref} = \dfrac{-1}{2C_f+2C_r}\left[\dfrac{(-2C_fl_f+2C_rl_r-v_x)}{v_x}r_{ref} + 2C_f\delta\right];$$

wherein $\delta$ is a front wheel steering angle, and $\beta_{ref}$ and $r_{ref}$ are a desired vehicle slip angle and yaw velocity, respectively.

14. The computer-readable storage medium according to claim 11, wherein in the economical optimization strategy construction method, the lateral stability controller is:

$$J = \dfrac{1}{2}\|\overline{X}_t^{N_p}\|_Q^2 + \dfrac{1}{2}\sum_{k=1}^{N_p-1}\left(\|\overline{X}_t^k\|_Q^2 + \|U_t^k\|_R^2\right) + \rho\varphi^2;$$

$$\overline{X}_t^{k+1} = (I + \overline{A}T)\overline{X}_t^k + \overline{B}TU_t^k$$

$$\overline{X}_t^k = X_t^k - X_{ref}(t)$$

-continued $$\Delta\underline{\delta}_f + \varphi\sigma_\delta < \Delta\delta_f < \Delta\overline{\delta}_f + \varphi\sigma_\delta$$

$$\Delta\underline{U} + \varphi\sigma_U < \Delta U < \Delta\overline{U} + \varphi\sigma_U$$

wherein J is a cost function of the lateral stability control system, matrices Q and R are constant positive definite matrices, ρ is a weight coefficient, T is a time interval of unit step, $N_p$ is a prediction step size, $X_{ref}(t)$ and $X_i^k$ are a reference value at t and a state quantity of a kth prediction step respectively, I is a unit matrix, ΔU is a change value of a control quantity, $\Delta\overline{U}$ and $\Delta\underline{U}$ and are upper and lower limits of ΔU respectively, φ is a relaxation variable, and $\sigma_\delta$ and $\sigma_U$ are relaxation coefficients.

15. The computer-readable storage medium according to claim 11, wherein in the economical optimization strategy construction method, the objective function is:

$$\min_{sat(U_T)} J_e = \|\Lambda U_T - \Delta M(L)\|_{p_T}^2 + \sum_{i=lf}^{lf,lr,rr,rf}\|1/g(s,T_i)\|_{v_{ei}}^2 + \|sat(U_T)\|_{Q_T}^2 + \|\Delta U_T\|_{B_f}^2;$$

wherein $J_e$ is a cost function of a torque distribution of an in-wheel motor, the coefficient matrix $\Lambda=[1\ 1\ -1\ 1]b/(2R)$, R is a wheel radius, b is a left and right wheel track, the control quantity $U_T=[T_{lf}\ T_{lr}\ T_{rf}\ T_{rr}]^T$, Ti(i=lf, lr, rr, rf) is a motor torque, the subscripts lf, lr, rr, rf represent a left front wheel, a left rear wheel, a right rear wheel, a right front wheel respectively, $v_{ei}$ and $p_T$ are weight coefficients, $Q_T$ and $R_T$ are both weight matrices, and sat( ) is a saturation function.

16. The computer-readable storage medium according to claim 15, wherein in the economical optimization strategy construction method, the constraint of the objective function is:

$$\Delta\underline{U}_T \leq \Delta U_T \leq \Delta\overline{U}_T$$

$$[1\ 1\ 1\ 1]U_T = T_r$$

$$sat(U_T(t)) = \begin{cases} U_T(t), & |U_T(t)| \leq U_{Tmax} \\ \text{sign}(U_T(t))U_{Tmax}, & |U_T(t)| > U_{Tmax} \end{cases}$$

wherein $\Delta \overline{U}_T$ and $\Delta \underline{U}_T$ are maximum and minimum values of the increment $\overline{\Delta UT}$, respectively, $T_r$ is a total drive torque, $U_{Tmax}$ is a maximum control input, and sign( ) is a sign function.

17. The computer-readable storage medium according to claim 11, wherein in the economical optimization strategy construction method, the operation of determining the workflow of the regulator of the coordinational variable based on the three-dimensional surface comprises:
  determining a two-dimensional plane according to the three-dimensional surface, wherein the two-dimensional plane is a plane when a vertical axis of the three-dimensional surface is zero; the coordinate axis $X_T$ and the coordinate axis $Y_T$ of the three-dimensional surface are both in-wheel motor torques, and the coordinate axis $Z_E$ of the three-dimensional surface is the motor efficiency;
  constructing a torque constraint for an in-wheel motor, wherein the torque constraint is $$x_1 + y_1 = z_1 = z^* + \Delta z$$
$$x_3 + y_2 = z_2 = z^* - \Delta z$$

wherein the in-wheel motor torque $T_{lf}$, $T_{lr}$, $T_{rr}$ and $T_{rf}$ are $x_1$, $y_1$, $x_2$ and $y_2$, respectively, $T_r/2$ is recorded as $z^*$, and $R\Delta M/b$ is recorded as $\Delta z$;
  determining first and second lines on the basis of a geometric relationship of the torque constraint, wherein projections of points on the first and second lines in the two-dimensional plane in X and Y coordinate axes are the in-wheel motor torque $x_1$, $y_1$, $x_2$ and $y_2$, respectively; and
  on the basis of a theoretical analysis of a Gauss surface, determining the workflow according to the first line, the second line, the three-dimensional surface and the two-dimensional plane.

* * * * *